Jan. 13, 1953  W. V. JORDAN  2,625,331
MIXING VALVE
Filed Dec. 13, 1949  3 Sheets-Sheet 3

*INVENTOR.*
WILLIAM V. JORDAN
BY
J. Warren Kinney Jr.
ATTORNEY

Patented Jan. 13, 1953

2,625,331

UNITED STATES PATENT OFFICE 2,625,331

MIXING VALVE

William V. Jordan, Lebanon, Ohio, assignor to Jordan Regulator Corporation, Lebanon, Ohio, a corporation of Ohio Application December 13, 1949, Serial No. 132,777

10 Claims. (Cl. 236—12)

1

This invention relates to mixing valves and more particularly to a mixing valve having operatively associated therewith thermal responsive actuator means which will automatically and continuously proportion the flow of fluids being mixed whereby to provide a substantially uniform temperature in the resultant mixture.

An object of the invention is to provide a mixing valve characterized by its extreme sensitivity to temperature fluctuations in the resultant mixture whereby the overall temperature will be constantly maintained at any preselected value.

Another object of the invention is to provide a mixing valve which, though extremely sensitive in its operating characteristics, is nevertheless quite durable, dependable and rugged, whereby to adequately withstand the knocks and abuse to which such valves are subjected in commercial installations.

Still another object of the invention is to provide a mixing valve having a spring-biased sliding gate valve which is actuated by means of a control rod extending outwardly from the valve housing, wherein suitable control rod actuating means are disposed on said rod and located externally of the valve housing.

A further object of the invention is to provide a mixing valve having the hereinabove described characteristics which also includes means for controlling the volume of fluid passing through the device.

Still another object of the invention is to provide an improved mixing valve which is ideally adapted to be produced using modern mass-production techniques.

These and other objects are attained by the means described herein and as disclosed in the accompanying drawings in which.

2

Figure 2:
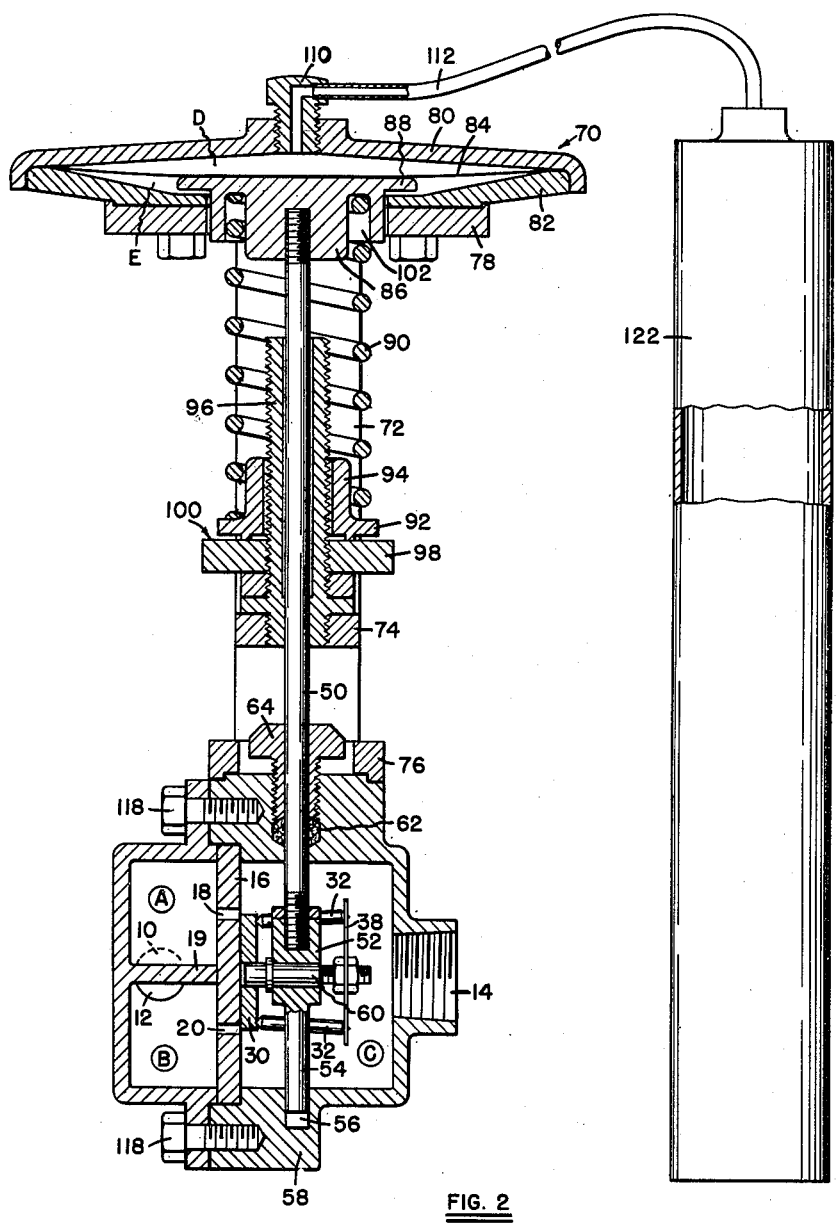
Fig. 2 is a vertical section through the valve mechanism of Fig. 1.

With reference now to Fig. 2, it will be observed that the instant valve comprises three chambers denoted generally by the letters A, B and C.

Chambers A, B and C will hereinafter be referred to as the first, second and third chambers, respectively. Each of said chambers is provided with a port in open communication with the interior thereof designated by the numerals 10, 12 and 14, respectively.

Figure 4:
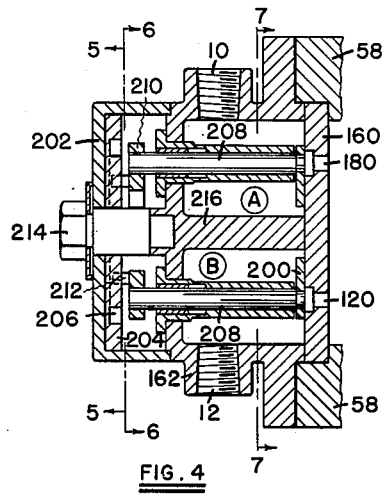
Fig. 4 is a vertical sectional view of a volume control comprising a detail of the present invention.
Figure 5:
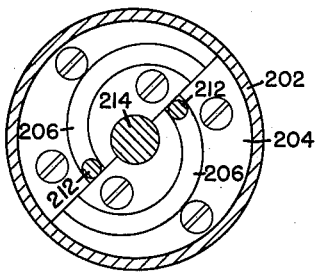
Fig. 5 is a sectional view taken on line 5—5 of Fig. 4.
Figure 6:
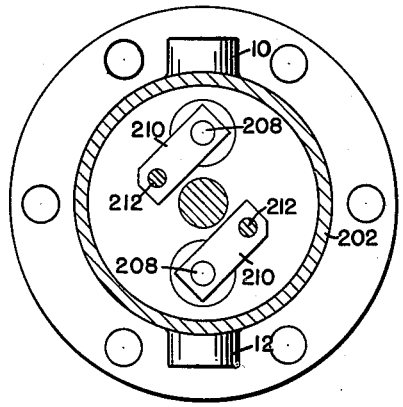
Fig. 6 is a sectional view taken on line 6—6 of Fig. 4.
Figure 7:
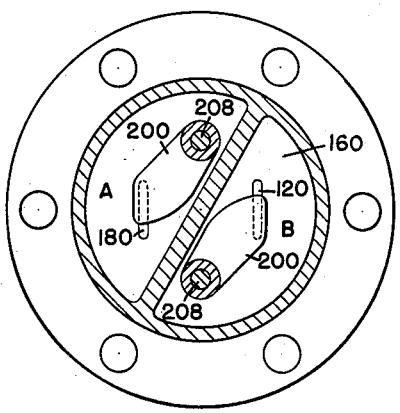
Fig. 7 is a sectional view taken on line 7—7 of Fig. 4.

An orifice plate 16 is provided between the third chamber and each of the first and second chambers, as clearly illustrated in Figs. 2 and 4. Said orifice plate may, if desired, be securely though releasably anchored in place by means of the action of fastening elements 118.

The orifice plate is provided with a pair of ports 18 and 20. Port 18 is disposed in interconnecting relationship between chambers A and C, whereas port 20 is disposed in interconnecting relationship with chambers B and C, it being noted that chambers A and B are entirely self-contained and are separated from one another by barrier 19.

Fluid introduced into chambers A and B will be discharged, through ports 18 and 20, respectively, into chamber C, which comprises a mixing chamber from which the mixed fluids will be discharged through port 14.

A slide valve 30 is located within chamber C wherein the dimensional characteristics of the valve are such as to selectively engage ports 18 and 20 for proportionately varying their relative openings. That is, when one of the ports in the orifice plate has been closed, the other port therethrough will have been completely opened.

Figure 3:
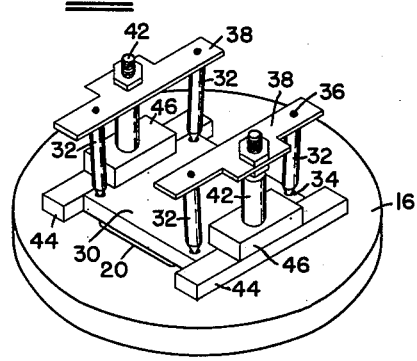
Fig. 3 is an isometric view of the orifice plate and sliding valve assemblage comprising a detail of the invention.

With reference now to Figs. 2 and 3, it will be observed that the slide valve is normally and yieldably urged against and in seating relationship with the orifice plate by means of pins 32, the ends of which are made conical to be received within and engage complementary socket portions 34 provided in the slide valve.

The opposite end of each of pins 32 are received within socket portions 36 of spring struts 38 secured to orifice plate 16 by means of a fastening member 42.

As best illustrated in Fig. 3, each spring strut 38 may be T-shaped in form wherein the ends of the top element are provided with sockets 36 which are disposed in laterally spaced overhanging relationship above the slide valve.

If desired, a guide track may be provided for insuring rectilinear motion of the gate; such means may comprise a pair of laterally spaced elements 44 suitably secured to the orifice plate, and a pair of laterally spaced elements 46 disposed one each on top of and in overhanging relationship with an element 44.

The operating characteristics of slide valve 30 are controlled by actuator rod 50, one end of which is secured to a coupling element 52, which may include an integrally formed, downwardly extending guide portion 54, the free lower end of which is slidably receivable within socket 56 provided in housing 58. A pin 60 operatively interconnects coupling element 52 and valve 30 as clearly illustrated in Fig. 2. Suitable packing denoted generally by the numeral 62 and a packing gland nut 64 may be utilized for effecting a fluid-tight seal which will permit axial motion of actuator rod 50 relative to housing 58.

A housing denoted generally by the numeral 70 is secured in spaced relationship to housing 58 by means of a bracket or bonnet cage 72, which includes an intermediate element 74 spaced between lower plate 76 and upper plate 78. Housing 70 comprises, in reality, two parts, an upper or dome portion 80 and a lower portion 82. A diaphragm 84 is disposed in spanning relationship across and between portions 80 and 82, the peripheral edges of said diaphragm being securely and permanently anchored to the adjacent portions of members 80 and 82 such as, by way of example, by silver solder, or the like, thereby dividing housing 70 into an upper chamber D and a lower chamber E.

That end of actuator rod 50 remote from slide valve 30 is threadably received within a diaphragm pressure nut 86, the upper portion of which terminates in an enlarged bearing member 88, which is constructed and arranged to abuttingly engage the lower face of diaphragm 84.

It will be observed that the diaphragm pressure nut is dimensioned for free axial sliding movement with respect to housing 70 and upper plate 78 of bracket 72.

Resilient means, such as spring 90, may be provided around actuator rod 50, wherein the lower end of the spring engages flange 92 of a spring pressure nut 94, which slidably engages the outer portion of a diaphragm rod guide 96, the lower end of which is threadably received within the intermediate element 74 of bracket 72. A spring adjusting wheel 98 threadably engages the outer face of the diaphragm rod guide, it being noted that the upper face 100 of adjusting wheel 98 engages the lower portion of nut 92.

The upper end of spring 90 is received within undercut portion 102 of the diaphragm pressure nut 86.

From the foregoing, it will be observed that spring 90 will normally and yieldably urge actuator rod 50 upwardly, away from housing 58, for normally shifting valve 30 to the upper end of its stroke.

Chamber D is in open communication with the interior of a cylinder 122, the interior of which may be filled with a suitable thermal responsive fluid or gas which will normally fill chamber D and exert a counter-force on diaphragm 84 in a direction for urging valve 30 toward the lower end of its stroke. The interior of chamber D is in open communication with the cylinder 122 by means of a suitable fitting 110 and a length of tubing 112.

In operation of the valve a suitable source of hot fluid may, by way of example, be connected to inlet port 10 of chamber A and a suitable source of cold fluid, under pressure, connected to inlet port 12, of chamber B. The hot and cold fluids from chambers A and B, respectively, will be discharged through their respective orifice ports 18 and 20 into chamber C, in which they will be mixed whereby the fluid discharged through port 14 will be of a temperature between the temperatures of the hot and cold fluids entering ports 10 and 12.

Port 14 is normally in open communication with the interior of a tank, chamber, or the like, the temperature of the fluid in which it is desired to keep at a constant, predetermined temperature. Cylinder 122 is received in or located in the fluid in the container or chamber housing the fluid, the temperature of which is to be controlled. The temperature conditions existing within cylinder 122 resulting the establishment of a certain pressure within chamber D. By proper manipulation of spring adjusting wheel 98, the force resisting the downward movement of actuating rod 50, as induced by the pressure within chamber D, may be selectively and accurately determined whereby the temperature of fluid discharged through port 14 may be accurately preselected.

Having once determined the setting required to insure the desired temperature of fluid being discharged from port 14, any increase or decrease in the temperature of the fluid in which cylinder 122 is submerged, will result in an increase or decrease of the pressure existing within chamber D, which will be translated to linear motion of actuator rod 50 and sliding valve 30. In this manner the proportions of hot and cold fluids entering chamber C from chambers A and B will be accurately controlled.

Experiments and actual commercial installations embodying the instant mixing valve for use in controlling the temperature of water in X-ray film processing tanks have conclusively established that my valve is extremely sensitive to the slightest temperature fluctuation occurring in the fluid in which cylinder 122 is submerged. Even the smallest temperature fluctuation will result in an immediate movement of slide valve 30 for altering the proportion of hot and cold fluids until the temperature fluctuation has been nullified.

Figure 1:
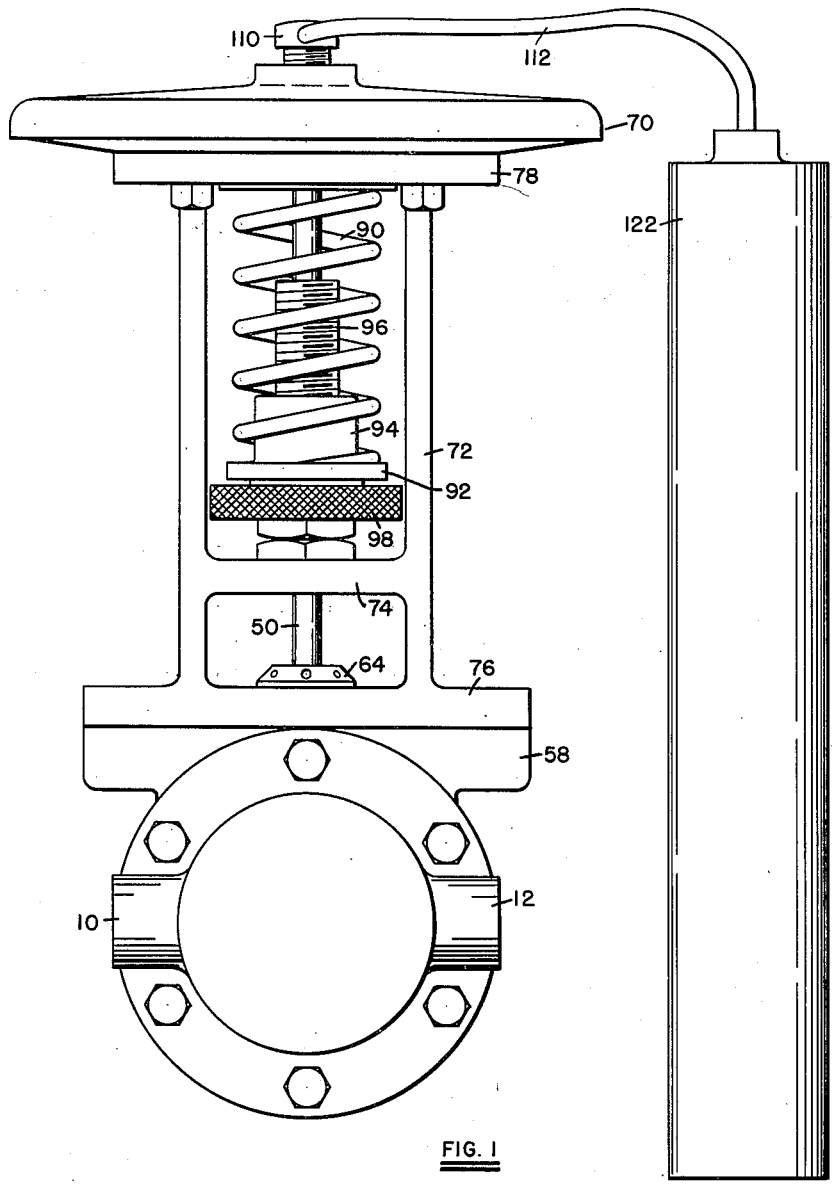
Fig. 1 is a side plan view of a mixing valve embodying the teachings of the present invention.

Highly satisfactory results are obtained from the device disclosed in Figs. 1 and 2; however in those instances wherein it is desirable or necessary to provide means for controlling the volumetric flow of fluid from port 14, the volume control illustrated in Figs. 4–7 may be associated with the device of Fig. 2 merely by removing retaining means 118 for enabling a different housing 162 containing ports A and B and a different orifice plate 160 to be associated with housing 58.

With reference now to Figs. 4–7, the numeral 160 represents an orifice plate having ports 180 and 120 therethrough for interconnecting chambers A and B with chamber C, as in Fig. 2. As best disclosed in Fig. 7, ports 180 and 120 may be elongated, as illustrated, for a reason hereinafter made more fully apparent. An orifice gate 200 is provided in each of chambers A and B for selectively engaging the orifice plate ports in communication with said respective chambers. Movement of gates 200 will result in varying the effective areas of ports 180 and 120, thereby effectively controlling the volumetric flow from chambers A and B into chamber C.

Suitable means are provided for synchronizing the operating characteristics of gates 200; said means comprising a manually turnable cap member 202, the inner face of which is provided with a plate 204 having a cam groove 206 provided therein. Each of gates 200 is secured to shafts 208, the other ends of which terminate in a lever 210 to which a cam follower 212 is secured, it being understood that followers 212 are received within their respective cam grooves 206.

Cap 202 is mounted for rotation about the axis of retaining member 214 suitably secured to housing 216, in which chambers A and B are contained.

From the foregoing it will be observed that rotation of cap 202 will result in synchronous movement of shafts 208 and their respective gates 200 for uniformly varying the areas of ports 180 and 120.

In this manner I have provided a mixing valve which is not only characterized by its extreme sensitivity to pressure changes, but which includes a built-in volume control which greatly enhances the utility of the device and eliminates the need for separate valves and cocks in the supply lines leading to ports 10 and 12 of chambers A and B, respectively.

It should be understood that various changes and modifications in the structural details of the device may be made, within the scope of the appended claims, without departing from the spirit of the invention.

What is claimed is:

1. A mixing valve comprising a first, a second, and a third chamber, a port in each of said chambers, an orifice plate including a pair of parallel, opposite, axial faces mounted between the third and said first and second chambers, said plate having a pair of passageways therethrough the opposite ends of which terminate in two ports in each axial face, one of said passageways interconnecting said first and third chambers, the second passageway interconnecting said second and third chambers, means in each of said first and second chambers for selectively engaging the orifice-plate-ports in one axial face for uniformly varying their respective areas for controlling the rate of flow of fluid therethrough, a slide valve located in the third chamber dimensioned to selectively engage the ports in the other axial face of said orifice plate for proportionately varying their relative openings, and means operative for shifting said slide valve relative to said ports.

2. A mixing valve comprising a first, a second, and a third chamber, a port in each of said chambers, an orifice plate including a pair of parallel, opposite, axial faces mounted between the third and said first and second chambers, said plate having a pair of passageways therethrough the opposite ends of which terminate in two ports in each axial face, one of said passageways interconnecting said first and third chambers, the second passageway interconnecting said second and third chambers, means in each of said first and second chambers for selectively engaging the ports in one axial face of the orifice-plate for uniformly varying their respective areas for controlling the rate of flow of fluid therethrough, a slide valve located in the third chamber dimensioned to selectively engage the ports in the other axial face of said orifice plate for proportionately varying their relative openings, means operative for yieldably urging said slide valve in seating relationship with said orifice plate, and other means operative for shifting the slide valve relative to said ports.

3. A mixing valve comprising a first, a second, and a third chamber, a port in each of said chambers, an orifice plate including a pair of parallel, opposite axial faces mounted between the third and said first and second chambers, said plate having a pair of passageways therethrough the opposite ends of which terminate in two ports in each axial face, one of said passageways interconnecting said first and third chambers, the second passageway interconnecting said second and third chambers, means located in each of said first and second chambers for selectively engaging the ports in one axial face of the orifice-plate for uniformly varying their respective effective areas for controlling the rate of flow of fluid therethrough, means operatively interconnecting said first mentioned means for synchronizing their operating characteristics, a slide valve located in the third chamber dimensioned to selectively engage the ports in the other axial face of said orifice plate for proportionately varying their relative openings, and means operative for shifting said slide valve relative to said ports.

4. A mixing valve comprising a first, a second, and a third chamber, a port in each of said chambers, an orifice plate including a pair of parallel opposite axial faces mounted between the third and said first and second chambers, said plate having a pair of passageways therethrough the opposite ends of which terminate in two ports in each axial face, one of said passageways interconnecting said first and third chambers, the second passageway interconnecting said second and third chambers, means located in each of said first and second chambers for selectively engaging the ports in one axial face of the orifice-plate for uniformly varying their respective effective areas for controlling the rate of flow of fluid therethrough, manually operable means for synchronizing the operating characteristics of said means, a slide valve located in the third chamber dimensioned to selectively engage the ports in the other axial face of said orifice plate for proportionately varying their relative openings, and means operative for shifting said slide valve relative to said ports in response to temperature changes occurring in an area in open communication with the port of said third chamber.

5. A mixing valve comprising a first, a second, and a third chamber, a port in each of said chambers, an orifice plate between the third and said first and second chambers, said plate provided with two ports, one interconnecting said first and third chambers, the second interconnecting said second and third chambers, gates located in each of said first and second chambers for selectively engaging the orifice-plate-ports for uniformly varying their respective effective areas for controlling the rate of flow of fluid therethrough, manually operable means for synchronizing the operating characteristics of said gates, said manually operable means including a shaft for each gate, a lever secured to and carried by that end of each shaft remote from its associated gate, a follower secured to and carried by each of said levers, a rotatable cap member, cam means secured to and carried by said cap, said followers engaging said cam means, a slide valve located in the third chamber dimensioned to selectively engage the ports in said orifice plate for proportionately varying their relative openings, and means operative for shifting said slide valve relative to said ports in response to temperature changes occurring in an area in open communication with the port of said third chamber.

6. A mixing valve comprising a first, a second, and a third chamber, a port in each of said chambers, an orifice plate between the third and said first and second chambers, said plate provided with two ports, one interconnecting said first and third chambers, the second interconnecting said second and third chambers; a slide valve located in the third chamber dimensioned to selectively engage the ports in said orifice plate for proportionately varying their relative openings, slide-valve guide means secured to and carried by said orifice plate, means secured to and carried by said guide means for yieldably urging said valve in contacting relationship with the orifice plate, and means for shifting said valve relative to the ports in said orifice plate.

7. A mixing valve comprising a first, a second, and a third chamber, a port in each of said chambers, an orifice plate between the third and said first and second chambers; said plate provided with two ports, one interconnecting said first and third chambers, the second interconnecting said second and third chambers, a slide-valve located in the third chamber dimensioned to selectively engage the ports in said orifice plate for proportionately varying their relative openings, slide-valve guide means secured to and carried by said orifice plate, means secured to and carried by said guide means for yieldably urging said slide-valve in contacting relationship with the orifice plate; a pair of axially aligned guideways in said third chamber, a coupling element including a guide portion receivable in and slidably engaging one of said guideways, means spanning and interconnecting the coupling element with the slide valve, and an actuator rod slidably engaging the other of said guideways and connected to said coupling element.

8. A mixing valve comprising a first, a second, and a third chamber, a port in each of said chambers, an orifice plate between the third and said first and second chambers, said plate provided with two ports, one interconnecting said first and third chambers, the second interconnecting said second and third chambers, a pair of laterally spaced slide-valve guide elements secured to and carried by that side of the orifice plate in open communication with the third chamber, a substantially rectangular slide valve having opposite side and top edges engaging said guide elements, spring struts for opposite sides of the valve, means securing said struts, one to and in spaced relationship with each of said guide elements, means interconnecting said struts one with each side of said valve for yieldably urging said valve in contacting relationship with the orifice plate, a coupling element dimensioned to be loosely received between said last mentioned means and between adjacent portions of said struts and slide valve, a pin spanning and interconnecting the coupling element and slide valve for transmitting movement of said element to said valve, and means engaging said coupling element for imparting linear movement thereto.

9. A mixing valve comprising a first, a second, and a third chamber, a port in each of said chambers, an orifice plate between the third and said first and second chambers, said plate provided with two ports, one interconnecting said first and third chambers, the second interconnecting said second and third chambers, a slide-valve located in the third chamber dimensioned to selectively engage the ports in said orifice plate for proportionately varying their relative openings, slide-valve guide means secured to and carried by said orifice plate, means secured to and carried by said guide means for yieldably urging said valve in contacting relationship with the orifice plate, a pair of axially aligned guideways in said third chamber, one disposed entirely within said chamber, the second extending through the chamber wall, a coupling element including a depending guide portion slidably engaging the first of said guideways, an actuator rod extending through and slidably engaging the other of said guideways connected to said coupling element in axial alignment with but remote from said guide portion, means perpendicular with the axis of travel of said coupling element spanning and connecting said element to the slide-valve free of axial pressure thereagainst.

10. A mixing valve comprising a first, a second, and a third chamber, a port in each of said chambers, an orifice plate between the third and said first and second chambers, said plate provided with two ports, one interconnecting said first and third chambers, the second interconnecting the second and third chambers, a flat, substantially rectangular slide valve including substantially parallel side and end edges, said valve located in the third chamber with its side edges dimensioned to selectively engage the ports in said orifice plate for proportionately varying their relative openings, slide valve guide means secured to and carried by said orifice plate for overlappingly engaging the opposite end edges of said valve, means secured to and carried by said guide means for yieldably urging said valve in contacting relationship with the orifice plate, and means for shifting said valve relative to the ports in said orifice plate.

WILLIAM V. JORDAN.

REFERENCES CITED

The following references are of record in the file of this patent:

UNITED STATES PATENTS

| Number | Name | Date |
|---|---|---|
| 1,153,547 | Finney | Sept. 14, 1915 |
| 1,854,918 | Adams | Apr. 19, 1932 |
| 1,934,982 | Jones | Nov. 14, 1933 |
| 1,942,269 | Davies et al. | Jan. 2, 1934 |
| 2,001,318 | Spence | May 14, 1935 |
| 2,083,876 | Snediker | June 15, 1937 |
| 2,465,458 | Jordan | Mar. 29, 1949 |